United States Patent [19]

Teramachi

[11] Patent Number: 4,616,886
[45] Date of Patent: Oct. 14, 1986

[54] LINEAR SLIDE BEARING AND LINEAR SLIDE TABLE UNIT EMPLOYING THE SAME

[76] Inventor: Hiroshi Teramachi, 2-34-8, Higashi-Tamagawa, Setagaya-Ku, Tokyo, Japan

[21] Appl. No.: 815,285

[22] Filed: Dec. 26, 1985

Related U.S. Application Data

[63] Continuation of Ser. No. 602,839, Apr. 23, 1984, abandoned.

[30] Foreign Application Priority Data

May 2, 1983 [JP] Japan ................................. 58-76233
May 16, 1983 [JP] Japan ................................. 58-84020

[51] Int. Cl.⁴ ............................................. F16C 29/06
[52] U.S. Cl. ......................................................... 384/45
[58] Field of Search ............... 308/3 R, 3 A, 6 R, 6 C; 384/516, 519, 615, 616, 610

[56] References Cited

U.S. PATENT DOCUMENTS

| | | | |
|---|---|---|---|
| 2,659,637 | 11/1953 | Barr | 384/558 |
| 2,945,366 | 7/1960 | Sears | 308/6 C X |
| 3,560,061 | 7/1968 | Shaw, Jr. | 308/6 C |
| 4,296,974 | 10/1981 | Teramachi | 308/6 C |
| 4,312,545 | 1/1982 | Blaurock et al. | 308/6 C |
| 4,431,236 | 2/1984 | Orain | 384/512 |
| 4,472,003 | 9/1984 | Osawa | 308/6 C |

*Primary Examiner*—Stuart S. Levy
*Assistant Examiner*—David Werner
*Attorney, Agent, or Firm*—Jordan and Hamburg

[57] ABSTRACT

A linear slide bearing comprises: a main body of substantially inverted U-shaped cross-section having a horizontal portion and a pair of sleeve portions downwardly extending from both ends of the horizontal portion and defining therebetween a cavity on the lower side of the main body, each sleeve having a raceway groove of substantially semicircular cross-section formed in its inner surface along the longitudinal direction thereof, and each sleeve further having a recirculating ball bore longitudinally extending therethrough; a track shaft having its upper part fitted in the cavity in the main body with a predetermined clearance therebetween, the track shaft being provided, in each of the side surfaces facing the inner surfaces of both sleeve portions of the main body, with a raceway groove of substantially semicircular cross-section extending in the longitudinal direction of the track shaft while confronting the corresponding one of the raceway grooves formed in the inner surfaces of the sleeve portions to constitute a loaded ball region; a pair of covers adapted to be attached to both longitudinal ends of the main body, each cover being provided in its inner surface with guide grooves for providing communication between the recirculating ball bores and loaded ball regions to constitute endless tracks, respectively; and a multiplicity of balls adapted to be recirculated through the endless tracks and to bear a load between the main body and track shaft within the loaded ball regions.

4 Claims, 23 Drawing Figures

LINEAR SLIDE BEARING AND LINEAR SLIDE TABLE UNIT EMPLOYING THE SAME

This application is a continuation, of application Ser. No. 602,839, filed Apr. 23, 1984 now abandoned.

BACKGROUND OF THE INVENTION

The present invention relates to a linear slide bearing and a linear slide table unit constructed by employing the same. More particularly, the invention pertains to a linear slide bearing and a linear slide table unit which are widely employed in the sliding part of various general industrial machines such as X-, Y- and Z-axes of numerical controlled machine tools, automatic tool changers, automatic welding machines, injection molding machines and industrial robots.

Hitherto, this kind of linear slide bearing has been composed of: a main body of substantially channel-like cross-section having a cavity formed on the lower side thereof; a track shaft having its upper part fitted in the cavity in the main body with a predetermined clearance therebetween; and a multiplicity of balls adapted to recirculate through two pairs of endless tracks formed on the main body. The balls recirculating through each pair of endless tracks are adapted to roll while clamping, from both sides, each of the ridges formed on both shoulder portions of the track shaft, thereby allowing the bearing to effect a linear reciprocation while bearing loads applied to the main body in vertical and radial directions.

In such a conventional linear slide bearing, however, it is necessary to form two pairs of endless tracks on the main body, and the track shaft must be formed with the number of raceway grooves corresponding to that of the endless tracks. In consequence, much labor is required for machining the main body and track shaft, particularly for forming the endless tracks and raceway grooves, resulting disadvantageously in a great increase in production cost.

Further, such a linear slide bearing is required to be incorporated with high accuracy into the sliding part of a general industrial machine. In addition, the bearing is required to be excellent in positioning and repetition accuracies as well as long in life. These characteristics are especially important for a linear slide table unit which performs a linear reciprocating motion while bearing a large load. It is also necessary to arrange the linear slide bearing so that it can easily display the above characteristics when incorporated in the table unit.

In such a linear slide bearing, however, if there is a clearance between raceways and balls which bear a load between the main body and the track shaft, an excessively large impact load is momentarily applied to the bearing by means of a hammering action or a prying and twisting load due to inertia moment at the time of a directional change in the reciprocating motion, thus causing a reduction in life. In addition, the positioning and repetition accuracies deteriorate in proportion to the amount of the clearance.

Accordingly, in the linear slide bearing of this kind, it is necessary to apply a preload to the bearing in order to make the above-mentioned clearance negative and increase the area of contact of each ball, so as to improve the load bearing capacity as well as enhancing the life and rigidity of the bearing. It is, therefore, desired that the linear slide bearing can be readily preloaded.

SUMMARY OF THE INVENTION

In view of the above, it is an object of the invention to provide a novel and improved linear slide bearing and linear slide table unit incorporating the same, which can overcome the above-described disadvantages of the prior art and meet the above-described demands.

It is another object of the invention to provide a linear slide bearing which can be manufactured at a reduced cost by minimizing the number of ball-rolling endless tracks formed on the main body and the number of raceway grooves formed on the track shaft.

It is still another object of the invention to provide a linear slide bearing which is constructed so as to be highly accurately incorporated in the sliding part of a general industrial machine, such as a linear slide table unit, and readily preloaded when incorporated, thereby allowing the load bearing capacity and life of the bearing itself to be greatly increased as well as permitting its rigidity to be enhanced.

It is a further object of the invention to provide a linear slide bearing which can be used solely in those cases where the load to be born is relatively small and chatter and differential slip are allowable to some extent.

To these ends, according to an aspect of the invention, there is provided a linear slide bearing comprising: a main body of substantially inverted U-shaped cross-section having a horizontal portion and a pair of sleeve portions downwardly extending from both ends of the horizontal portion and defining therebetween a cavity on the lower side of the main body, each sleeve having a raceway groove of substantially semicircular cross-section formed in its inner surface along the longitudinal direction thereof, and each sleeve further having a recirculating ball bore longitudinally extending therethrough; a track shaft having its upper part fitted in the cavity in the main body with a predetermined clearance therebetween, the track shaft being provided, in each of the side surfaces facing the inner surfaces of both sleeve portions of the main body, with a raceway groove of substantially semicircular cross-section extending in the longitudinal direction of the track shaft while confronting the corresponding one of the raceway grooves formed in the inner surfaces of the sleeve portions to constitute a loaded ball region; a pair of covers adapted to be attached to both longitudinal ends of the main body, each cover being provided in its inner surface with guide grooves for providing communication between the recirculating ball bores and loaded ball regions to consitute endless tracks, respectively; and a multiplicity of balls adapted to be recirculated through the endless tracks and to bear a load between the main body and track shaft within the loaded ball regions.

According to another aspect of the invention, there is provided a linear slide table unit comprising: a bed; and a mounting table slidably supported on the bed through a pair of bearings disposed in parallel to each other, wherein each of the bearings includes: a track shaft adapted to be secured to the bed at a mounting surface constituted by the bottom surface thereof, the track shaft being provided in each of its side surfaces with one raceway groove of substantially semicircular cross-section extending in the longitudinal direction thereof; a main body of substantially inverted U-shaped cross-section having a horizontal portion and a pair of sleeve portions downwardly extending from both ends of the horizontal portion, the main body being provided on the lower side thereof with a cavity through which the main body is slidably fitted on the upper part of the track shaft, each of the sleeve portions being provided in its inner surface with a raceway groove of substantially semicircular cross-section extending in the longitudinal direction thereof while confronting the corresponding one of the raceway grooves formed in the side surfaces of the track shaft to constitute a loaded ball region, each sleeve portion further having a recirculating ball bore longitudinally extending therethrough, the horizontal portion having its upper surface adapted to serve as a mounting surface which is inclined in either direction with respect to the mounting surface constituted by the bottom surface of the track shaft; a pair of covers adapted to be attached to both longitudinal ends of the main body, each cover being provided in its inner surface with guide grooves for providing communication between the recirculating ball bores and loaded ball regions thereby to constitute endless tracks, respectively; a multiplicity of balls adapted to be recirculated through the endless tracks and to bear a load between the main body and track shaft within the loaded ball regions; and at least a pair of connecting bolts for securing the main body to the mounting table at the mounting surface constituted by the upper surface thereof, the connecting bolts being disposed away from each other in the widthwise direction of the main body.

These and other objects, features and advantages of the invention will become clear from the following description of the preferred embodiments thereof taken in conjunction with the accompanying drawings.

It is to be noted that in the following description the reference numerals used denote the same or corresponding parts throughout a plurality of embodiments.

BRIEF DESCRIPTION OF THE DRAWINGS

FIGS. 14 to 23 in combination show a linear slide bearing in accordance with a second embodiment of the invention, in which:

FIG. 14 is a front elevational view of the linear slide bearing in accordance with the second embodiment of the invention;

FIG. 15 is a side elevational view of the linear slide bearing shown in FIG. 14;

FIG. 16 is a sectional view taken along the line XVI—XVI of FIG. 15;

FIG. 17 is a sectional view taken along the line XVII—XVII of FIG. 16;

FIG. 18 is a front elevational view of a main body of the linear slide bearing shown in FIG. 14;

FIG. 19 is a plan view of the main body shown in FIG. 18;

FIG. 20 is a sectional view of a track shaft of the linear slide bearing shown in FIG. 14;

FIG. 21 is a side elevational view of the track shaft shown in FIG. 20;

FIG. 22 is a front elevational view of a cover of the linear sliding bearing shown in FIG. 14; and FIG. 23 is a sectional view taken along the line XXIII—XXIII of FIG. 22.

DESCRIPTION OF THE PREFERRED EMBODIMENTS

Figure 1:
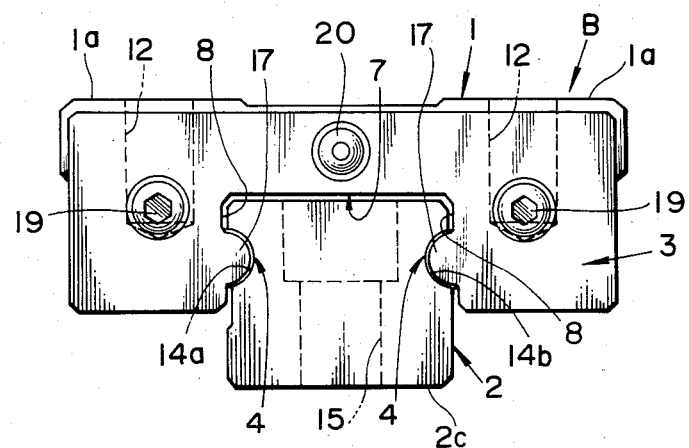
FIG. 1 is a front elevational view of a linear slide bearing in accordance with a first embodiment of the invention.

The linear slide bearing and linear slide table unit in accordance with the invention will be described hereinunder in detail through preferred embodiments thereof with reference to the accompanying drawings.

FIGS. 1 to 5 in combination show a linear slide bearing B in accordance with a first embodiment of the invention. The bearing B comprises: a main body 1 of inverted U-shaped cross-section having a horizontal portion 5 and sleeve portions 6a, 6b downwardly extending from both ends of the horizontal portion 5 and defining a cavity 7 therebetween on the lower side of the main body 1; a track shaft 2 having its upper part fitted in the cavity 7 on the lower side of the main body 1 with a predetermined clearance therebetween; a pair of covers adapted to be attached to both ends, in the longitudinal direction, of the main body 1; and a multiplicity of balls 4 adapted to be interposed between the main body 1 and the track shaft 2 so as to bear a load.

Figure 2:
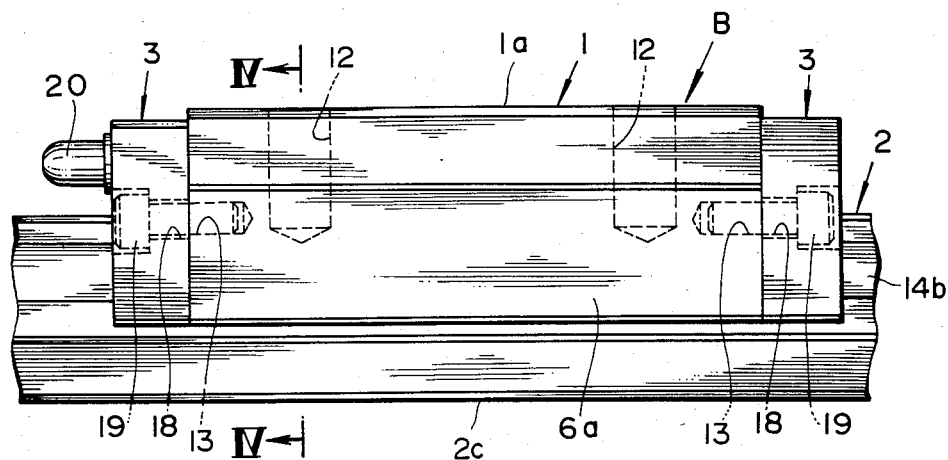
FIG. 2 is a side elevational view of the linear slide bearing shown in FIG. 1.
Figure 3:
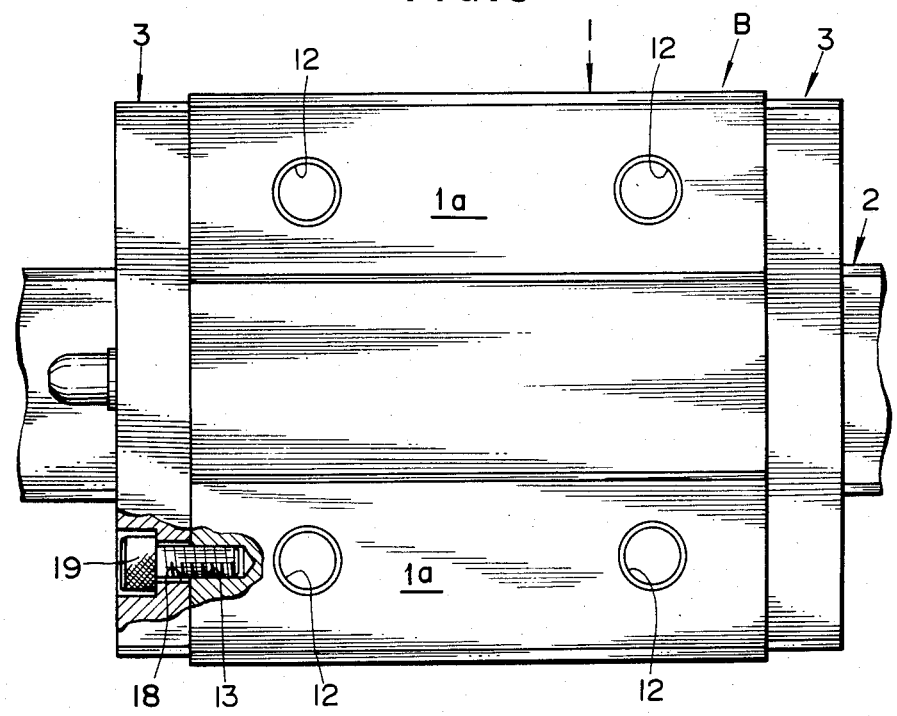
FIG. 3 is a plan view of the linear slide bearing shown in FIG. 1.
Figure 5:
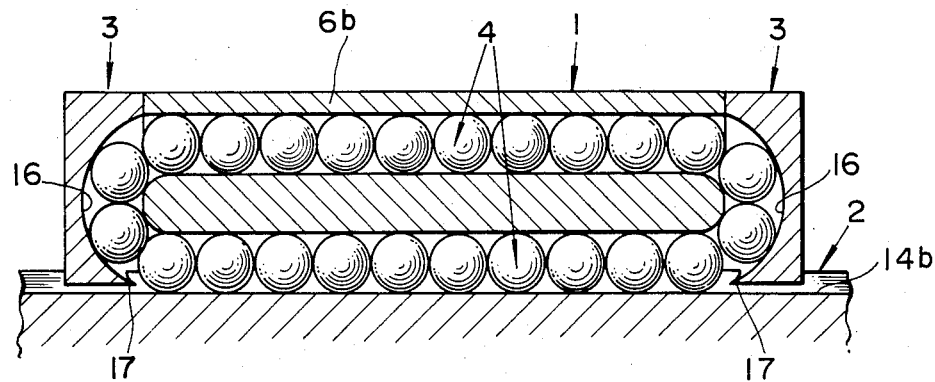
FIG. 5 is a sectional view taken along the line V—V of FIG. 4.
Figure 6:
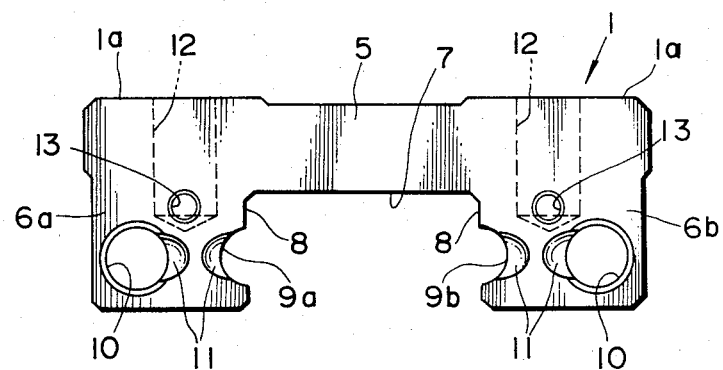
FIG. 6 is a front elevational view of a main body of the linear slide bearing shown in FIG. 1.

In the main body 1, as shown in FIGS. 2, 5 and 6, the opposing inner surfaces 8 of the sleeve portions 6a, 6b are constituted by vertical surfaces. These inner surfaces 8 have raceway grooves 9a, 9b longitudinally formed over the entire length of the main body 1. Each of the raceway grooves 9a, 9b is semicircular in cross-section and has a curvature substantially equal to that of the balls 4. Further, the sleeve portions 6a, 6b have recirculating ball bores 10 longitudinally extending therethrough. In addition, the main body 1 has pairs of rounded portions 11 formed between the raceway grooves 9a, 9b and the corresponding recirculating ball bores 10, each pair of rounded portions 11 being chamfered toward each other. Moreover, a mounting surface 1a constituted by the upper surface of the horizontal portion 5 is slightly inclined in either direction with respect to a mounting surface 2c constituted by the bottom surface of the track shaft 2. Fitting holes 12 used when a mounting table or the like is fixed to the mounting surface 1a are bored in the mounting surface 1a so as to be paired in the widthwise direction of the mounting surface 1a. Moreover, fitting holes 13 used when the cover 3 is mounted are bored in each of the end surfaces of the main body 1.

Figure 4:
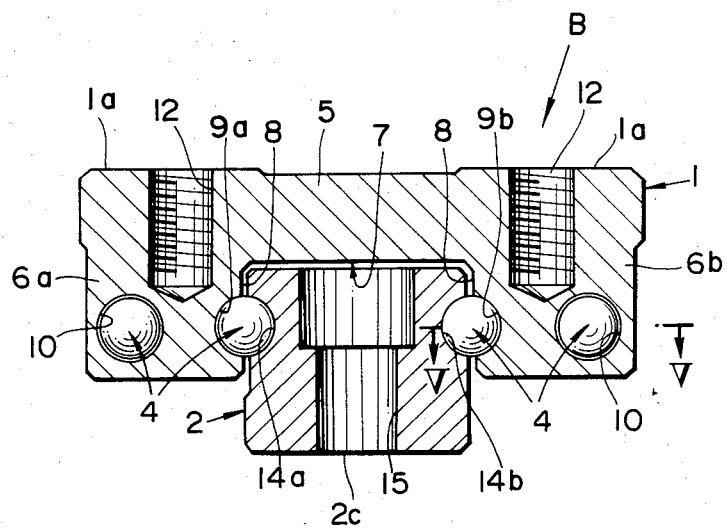
FIG. 4 is a sectional view taken along the line IV—IV of FIG. 2.
Figure 7:
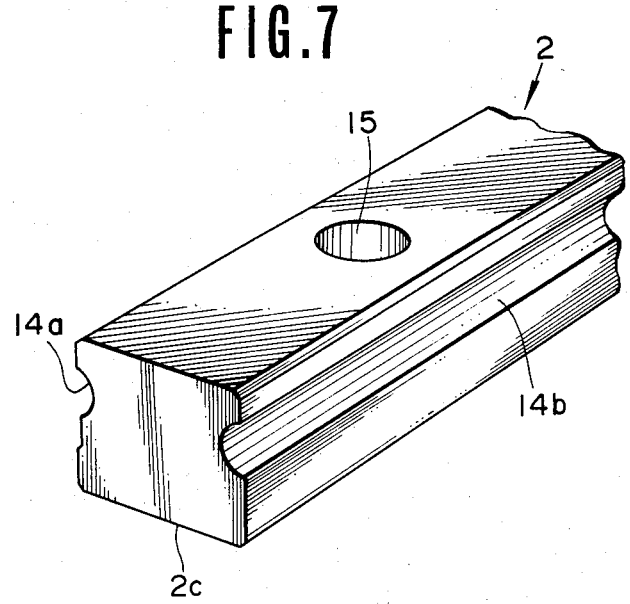
FIG. 7 is a perspective view of a part of a track shaft of the linear slide bearing shown in FIG. 1.
Figure 8:
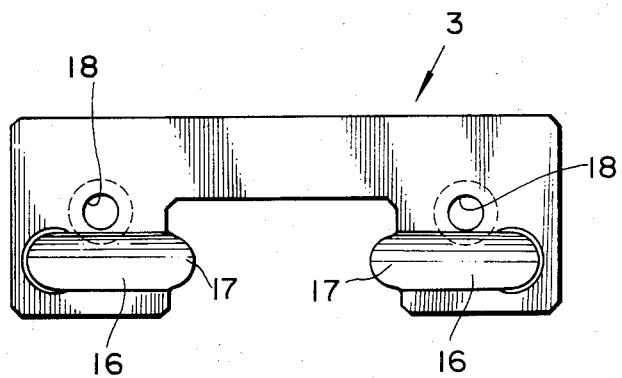
FIG. 8 is a rear view of a cover of the linear slide bearing shown in FIG. 1.

The track shaft 2, on the other hand, is designed to have a substantially rectangular cross-section as shown in FIGS. 4 and 7. Further, the upper part of the track shaft 2, which is received in the cavity 7 in the main body 1, has raceway grooves 14a, 14b formed longitudinally on the vertical side surfaces thereof while facing the inner surfaces 8 of the sleeve portions 6a, 6b, respectively. Each of the raceway grooves 14a, 14b is semicircular in cross-section and has a curvature substantially equal to that of the balls 4. The raceway grooves 9a, 9b on the main body and the raceway grooves 14a, 14b on the track shaft 2 cooperate with each other to constitute loaded ball regions. The track shaft 2 has fitting holes 15 vertically bored therethrough at proper spacings in the longitudinal direction thereof. The fitting holes 15 are used when the track shaft 2 is fixed to a mounting reference surface of the bed of a machine or apparatus.

Further, each cover 3 has guide grooves 16 formed on its inner surface as shown in FIGS. 1, 3, 5 and 8. The guide grooves 16 provide communication between the loaded ball regions constituted by raceway grooves 9a, 9b on the main body 1 and the raceway grooves 14a, 14b on the track shaft 2 on one hand and the recirculating ball bores 10 formed in the sleeve portions 6a, 6b of the main body 1 on the other, thereby to form respective endless tracks. Moreover, the guide grooves 16 are provided at one of their respective ends with guide projections or tongues 17 for guiding the balls 4, in the loaded ball regions, as they roll out of the passages formed between the raceway grooves 9a, 9b and 14a, 14b, and as they roll out of the recirculating ball bores 10 and guiding the same into the loaded ball regions from the guide grooves 16. It is to be noted that the reference numeral 18 in the Figures denotes each through hole through which a mounting bolt 19 passes when each cover 3 is attached to the main body 1, while the numeral 20 represents a grease nipple.

Figure 9:
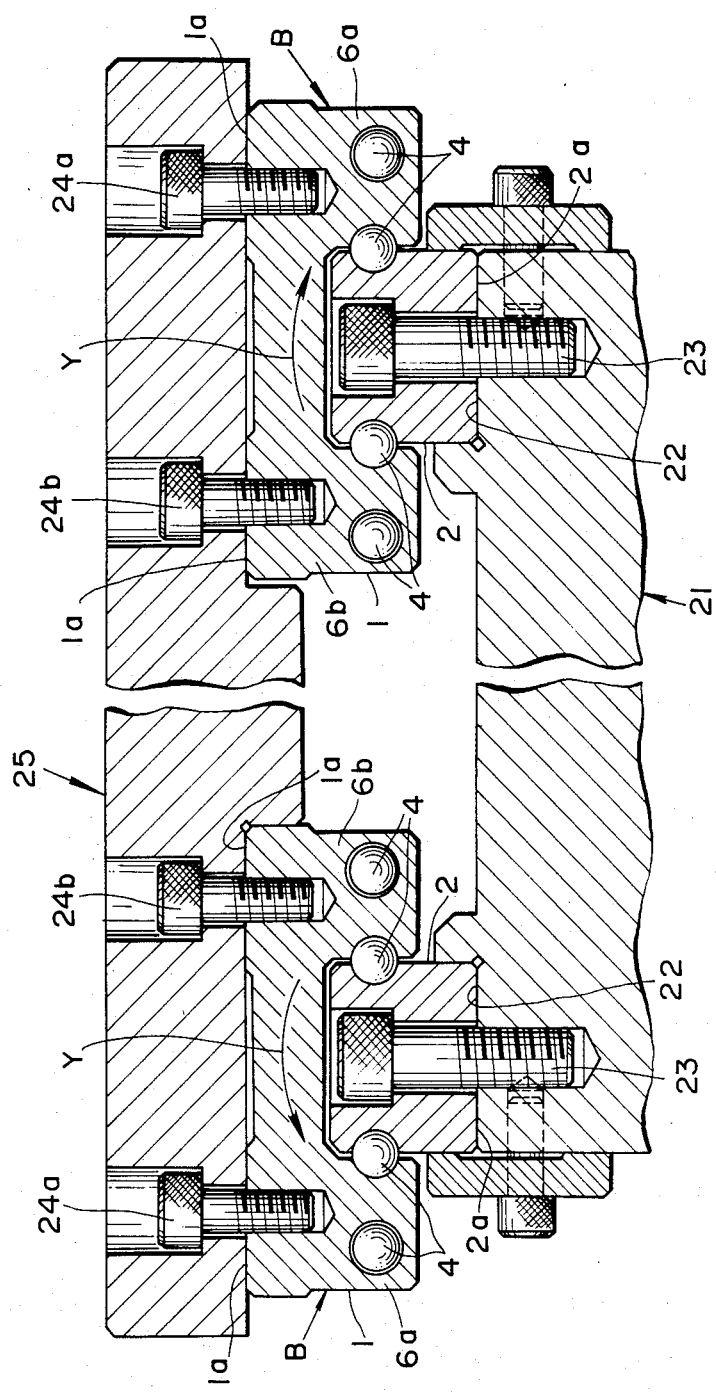
FIG. 9 is a sectional view of a linear slide table unit employing the linear slide bearing shown in FIG. 1.

FIG. 9 shows a linear slide table unit T incorporating therein a pair of bearings B. The table unit T is assembled as follows. The track shafts 5 of the bearings B are secured to the respective mounting reference surfaces 22 of a bed 21 of a machine or apparatus by means of mounting bolts 23. Moreover, a mounting table 25 is installed on the upper surfaces of the main bodies 1 and is connected to the bearing bodies 1 by means of connecting bolts 24a, 24b which are used in paired alignment in the widthwise direction of each main body 1.

When the table unit T is to be assembled, first, the track shaft 2 of each bearing B is secured to the bed 21 with the mounting surface 2c thereof located at the corresponding mounting reference surface 22 of the bed 21, and then, each main body 1 and the mounting table 25 placed on the mounting surface 1a are fastened together by means of the connecting bolts 24a, 24b, which are paired in the widthwise direction of the mounting surface 1a. In consequence, each main body 1 is inclined in either direction in correspondence with the inclination of the mounting surface 1a thereof. As a result, a twisting force is applied to each main body 1 in the direction of arrow Y, that is, a predetermined preload is applied to each bearing B.

In the above description, each bearing B is preloaded in accordance with the amount of inclination of the mounting surface 1a constituted by the upper surface of the main body 1. However, if necessary, shims (not shown) may be interposed between the portions of the main body 1 and the mounting table 25 closer to the connecting bolt 24a or 24b, to obtain a desired difference in the height from the mounting surface 2c of the track shaft 2 between the connecting bolt 24a side and the connecting bolt 24b side by properly changing the thickness of the shims, thereby to apply to each bearing B a preload in accordance with the height difference.

FIGS. 10, 11 and 12, 13 show modifications of the raceway grooves 9a, 9b and 14a, 14b on the main body 1 and track shaft 2 in the linear slide bearing B.

Figure 10:
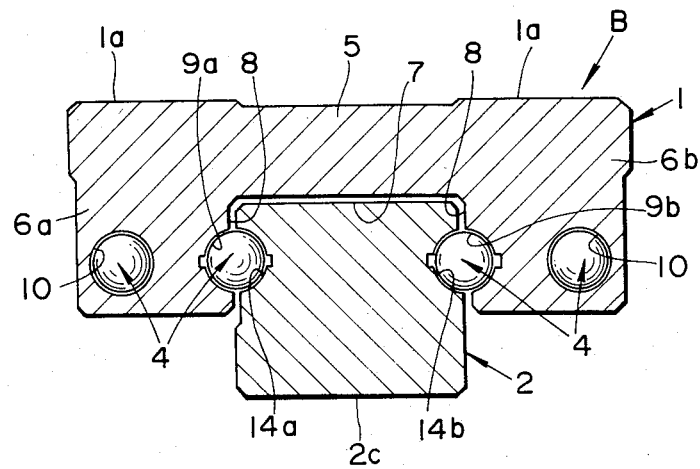
FIG. 10 is a sectional view of a modification of the first embodiment.
Figure 11:
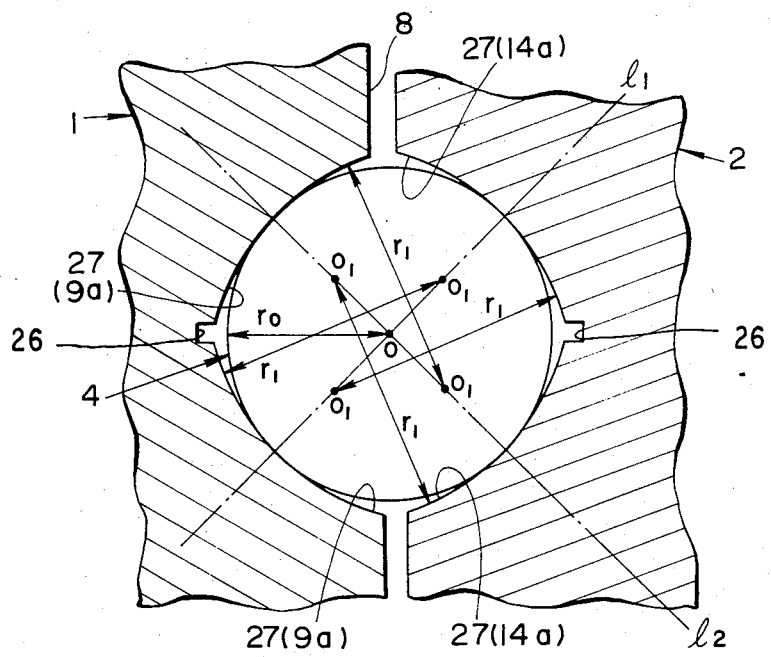
FIG. 11 is an enlarged sectional view of a part of the raceway groove shown in FIG. 10.

In the modification of the linear slide bearing B shown in FIGS. 10, 11, each of the raceway grooves 9a, 9b, 14a, 14b is halved by an elongated groove 26 formed in the center in the longitudinal direction thereof, thus creating a pair of arcuate surfaces 27. The curvature centers $o_1$ of the surfaces 27 are located on respective lines $l_1$, $l_2$ which are inclined leftwardly and rightwardly at 45° with respect to the vertical and pass through the center o of the ball 4 in the loaded ball region. In addition, each arcuate surface 27 is formed so that the curvature radius $r_1$ thereof is slightly larger than the curvature radius $r_0$ of the ball 4. In other words, each of the raceway grooves 9a, 9b, 14a, 14b is constituted by a Gothic arch groove. The bearing B in accordance with this modification can also be incorporated in the linear slide table unit T, similarly to the linear slide bearing B in accordance with the above-described embodiment. In this modification, since the arcuate surfaces 27 defining each of the raceway grooves 9a, 9b, 14a, 14b constituted by the Gothic arch groove are located on the respective lines $l_1$, $l_2$ both passing through the center o of the ball 4, when the bearing B is incorporated in the table unit T and preloaded, the areas of contact of the ball 4 can be formed on either the line $l_1$ or line $l_2$ for bearing a load. Thus, it is possible to uniformly bear loads applied in all directions.

Figure 12:
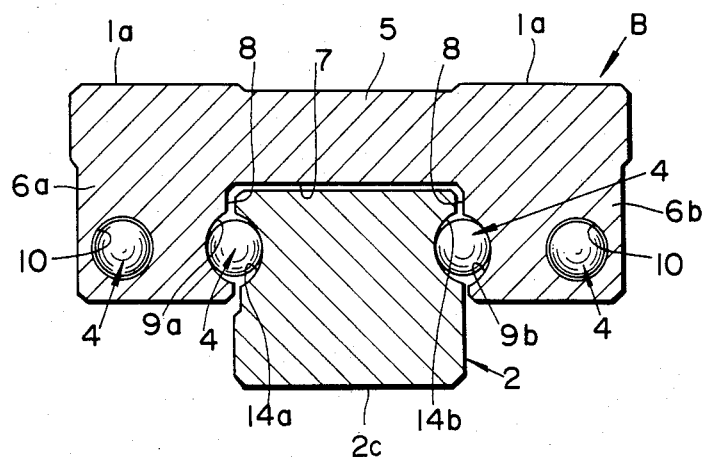
FIG. 12 is a sectional view of another modification of the first embodiment.
Figure 13:
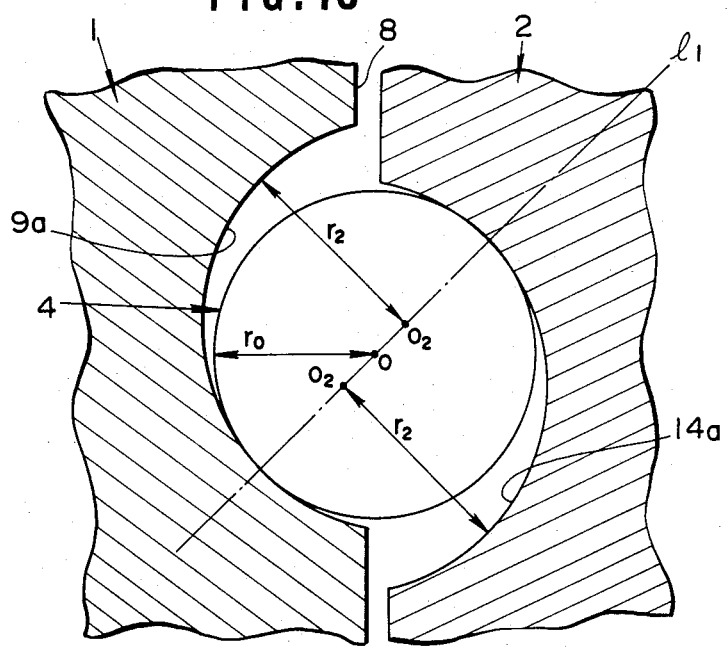
FIG. 13 is an enlarged sectional view of a part of the raceway groove shown in FIG. 12.
Figure 14:
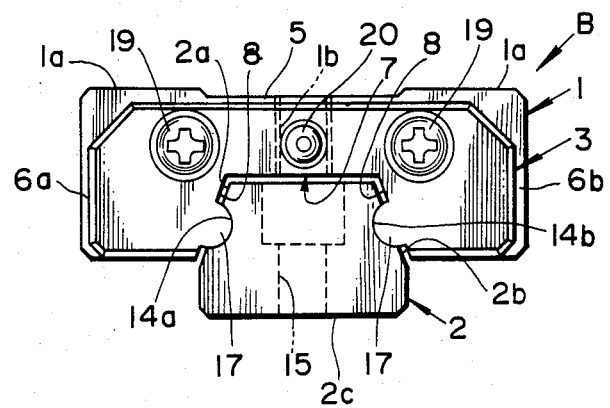
Figure 16:
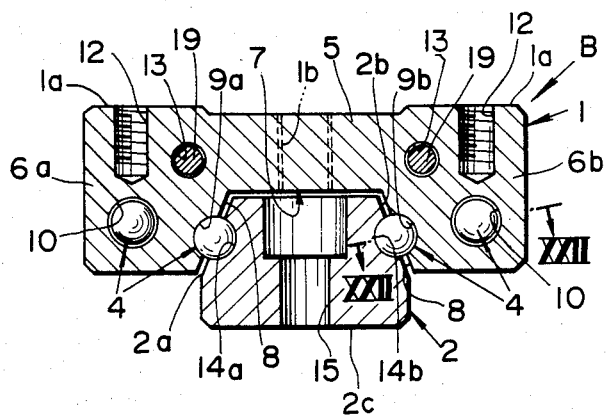
Figure 15:
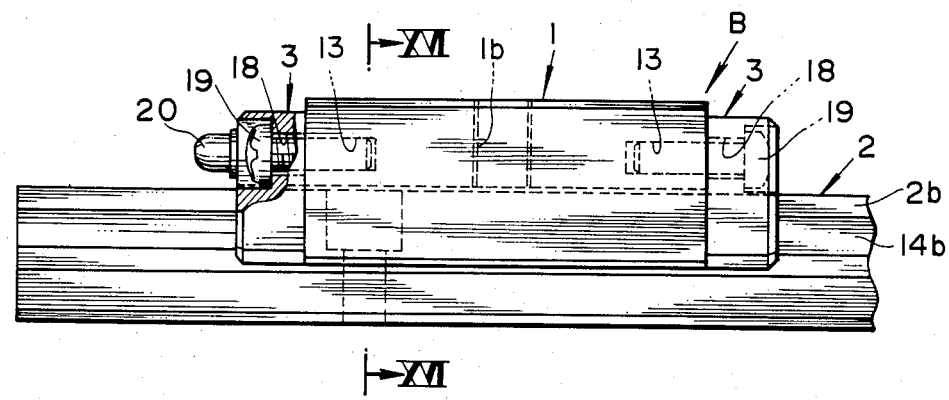
Figure 17:
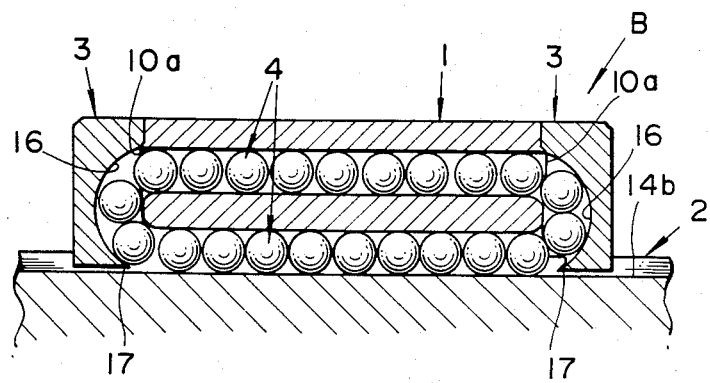
Figure 18:
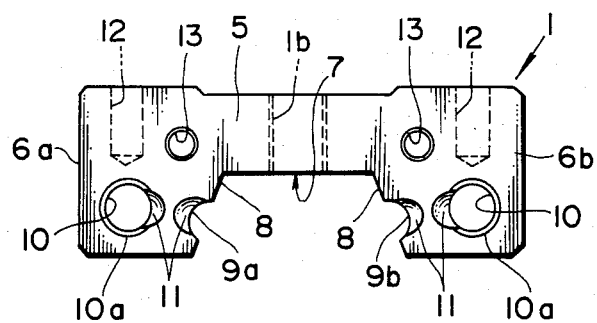
Figure 19:
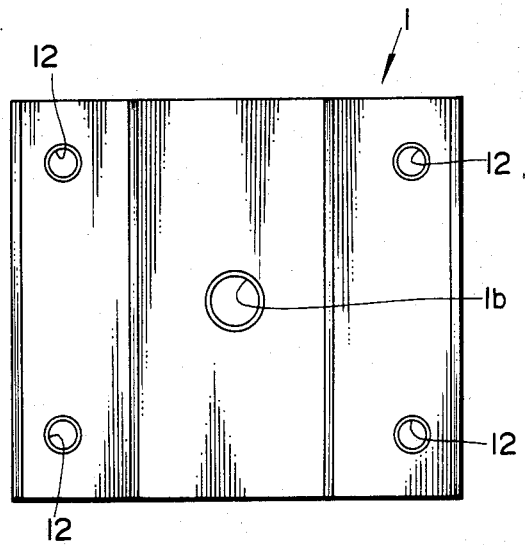
Figure 22:
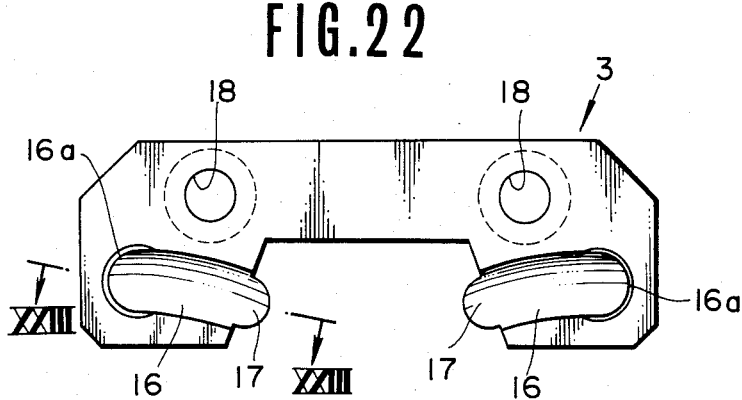
Figure 23:
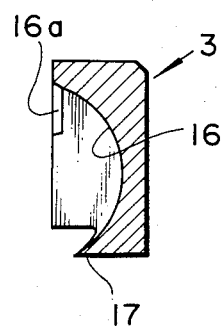

In the modification of the linear slide bearing B shown in FIGS. 12 and 13, each of the raceway grooves 9a, 9b, 14a, 14b is formed so that the curvature center $o_2$ of its inner surface is located on either of the lines $l_1$, $l_2$ passing through the center o of the ball 4 (the line $l_1$, in this modification), and the curvature radius $r_2$ of each inner surface is slightly larger than the curvature radius $r_0$ of the ball 4. In other words, each of the raceway grooves 9a, 9b, 14a, 14b is constituted by a circular arch groove. Further, the mounting surface 1a of the main body 1 is inclined in the same direction as the inclination of either of the lines $l_1$, $l_2$ passing through both the curvature center $o_2$ of the inner surface and the center o of the ball 4 (the line $l_1$, in this modification). The bearing B in accordance with this modification can be used similarly to that shown in FIGS. 10 and 11. In this case, however, the direction of twist of the main body 1 applied thereto when the bearing B is incorporated in the table unit T and preloaded is determined according to whether the curvature enter $o_2$ of the inner surface of each of the raceway grooves 9a, 9b, 14a, 14b is located on the line $l_1$ or line $l_2$. If the curvature center $o_2$ of the inner surface is located on the line $l_1$ as shown in FIGS. 12 and 13, the adjustment of height is effected on the right-hand side of the main body 1 to apply a twist to the main body 1 so that it is rotated in the clockwise direction.

According to the embodiment described above, the opposing raceway grooves of substantially semicircular cross-section are formed in the vertical opposing inner surfaces of the sleeve portions of the main body and the side surfaces of the track shaft, and a load is born by the balls rolling through the passages constituted by these raceway grooves. Accordingly, it is only necessary to form two raceway grooves on each of the main body and the track shaft. In consequence, the number of the troublesome machining processes required for highly accurately forming the raceway grooves is reduced to a half of that for the conventional bearing of this kind. Moreover, since the number of required parts is decreased, the production cost is reduced correspondingly. In addition, since it is possible to bear loads applied in vertical, horizontal and radial directions, the bearing can be used solely in those cases where the load to be born is relatively small and chatter and differential slip are allowable to some extent, which differential slip is generally caused when the areas of contact of each ball with the corresponding raceway grooves on the main body and the track shaft are undesirably offset from the axis of rotation of the ball. Moreover, since the mounting surface constituted by the upper surface of the horizontal portion of the main body is inclined in either direction with respect to the mounting surface constituted by the bottom surface of the track shaft, when the bearings are used in pair and incorporated in the linear slide table unit, it is possible to apply any desired preload to each bearing from the outside thereof simply by fastening the main body and the mounting table by means of the connecting bolts. Thus, the clearance between each ball and the corresponding raceways on the main body and the track shaft is made negative so that the balls are brought into contact with the raceway grooves with a wide contact area, thereby increasing the contact rate of the balls as a whole to make it possible to improve the bearing in load bearing capacity and life as well as rigidity.

A linear slide bearing B in accordance with a second embodiment of the invention is shown in FIGS. 14 to 23.

This bearing B comprises: a main body 1 of substantially inverted U-shaped cross-section having a horizontal portion 5 and sleeve portions 6a, 6b downwardly extending from both ends of the horizontal portion 5, the sleeve portions 6a, 6b having vertical opposing inner surfaces 8, the main body 1 further having a cavity 7 on the lower side thereof which is formed in the shape of a trapezoid diverging toward the open end; a track shaft 2 having its upper part formed in a trapezoidal shape and fitted in the trapezoidal cavity 7 in the main body 1 with a predetermined clearance therebetween; a pair of covers adapted to be attached to both ends, in the longitudinal direction, of the main body 1; and a multiplicity of balls 4 adapted to be interposed between the main body 1 and the track shaft 2 so as to bear a load.

The main body 1 has, as shown in FIGS. 16 to 19, raceway grooves 9a, 9b of substantially semicircular cross-section longitudinally extending along the opposing inner surfaces 8 of the sleeve portions 6a, 6b. Further, each of the sleeve portions 6a, 6b has a recirculating ball bore 10 longitudinally extending therethrough. In addition, the main body 1 has pairs of rounded portions 11 formed between the raceway grooves 9a, 9b and the corresponding recirculating ball bores 10, each pair of rounded portions 11 being chamfered toward each other. The main body 1 is further provided in its upper surface with fitting holes 12 used when a mounting table or the like is fixed thereto. Moreover, fitting holes 13 used when the cover 3 is mounted are bored in each of the end surfaces of the main body 1. It is to be noted that the reference numeral 1b in the Figures denotes each tapped hole screwed with a preload-adjusting bolt which is connected between the bearing B and the mounting table of the linear slide table unit when the bearing B is incorporated in the table unit.

The upper surface 1a of the main body is inclined in either direction with respect to the bottom surface 2c of the track shaft 2, as in the embodiment illustrated in FIGS. 1-13.

Figure 20:
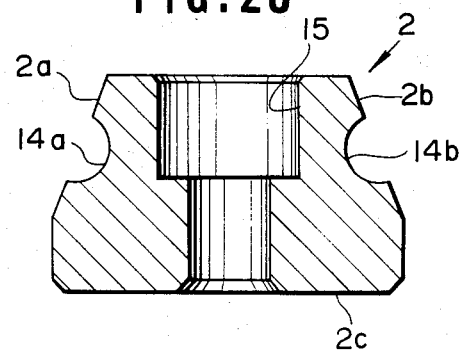
Figure 21:
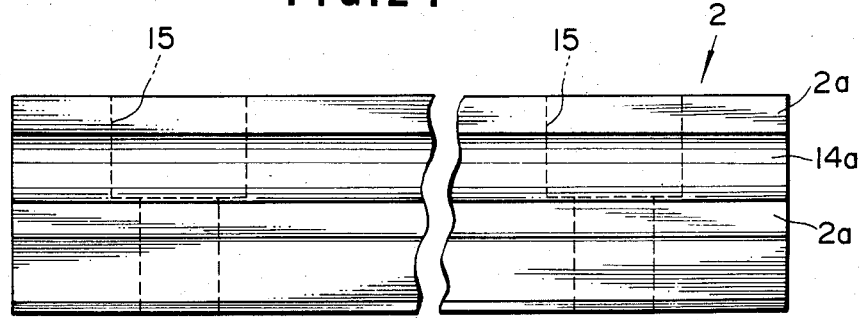

Referring now to FIGS. 20 and 21, which are enlarged views of the track shaft 2, the upper part thereof to be fitted in the trapezoidal cavity 7 formed on the lower side of the main body 1 is formed into a trapezoidal shape. On the inclined surfaces 2a, 2b which face the corresponding inner surfaces 8 of the sleeve portions 6a, 6b of the main body 1 when the trapezoidal upper part is fitted in the trapezoidal caivity 7, are longitudinally formed raceway grooves 14a, 14b of substantially semicircular cross-section confronting the raceway grooves 9a, 9b formed on the sleeve portions 6a, 6b, respectively. Thus, the confronting raceway grooves 9a, 9b and 14a, 14b cooperate with each other to constitute loaded ball regions for the balls 4. Further, the track shaft 2 is provided with fitting holes 15 used when the track shaft 2 is fixed to a mounting reference surface of a machine or apparatus.

Moreover, as shown in FIGS. 14, 15, 17, 22 and 23, each of the covers 3 is provided in its inner surface with guide grooves 16 for providing at both ends thereof communication between the loaded ball regions constituted by the raceway grooves 9a, 9b and 14a, 14b on the main body 1 and the track shaft 2 on one hand and the recirculating ball bores 10 formed in the main body 1, thereby to constitute respective endless tracks for the balls 4. Further, the guide grooves 16 are provided at one of their respective ends with guide projections or tongues 17, projecting into the corresponding raceway grooves 14a, 14b on the track shaft 2, for guiding the balls 4, in the loaded ball regions, as they roll out of the passages formed between the raceway grooves 9a, 9b and 14a, 14b, and as they roll out of the recirculating ball bores 10 and guiding the same into the loaded ball regions from the guide grooves 16. It is to be noted that the reference numeral 18 in the Figures denotes each through hole through which a mounting bolt 19 passes when each cover 3 is attached to the main body 1, while the numeral 20 represents a grease nipple.

As shown in FIGS. 17, 18, 22 and 23, in this embodiment, the main body 1 has a positioning ridge 10a of arcuate cross-section formed on the peripheral edge of each opening end of each recirculating ball bore 10 except for the associated rounded portion 11. In addition, each cover 3 is provided in each guide groove 16 thereof with a positioning chamfered portion 16a corresponding to the positioning ridge 10a. Thus, when the covers 3 are attached to both longitudinal ends of the main body 1, each positioning ridge 10a engages with the corresponding chamfered portion 16a to obtain an accurate coincidence between both ends of the recirculating ball bores 10 and the associated guide grooves 16 on the covers 3, thereby making it possible to smoothly guide the balls 4 as they roll from the recirculating bores 10 to the corresponding guide grooves 16, and vice versa.

It is to be noted that although in this embodiment the right and left portions of the linear slide bearing B are symmetrically formed with respect to the longitudinal axis thereof and both the trapezoidal cavity 7 formed on the lower side of the main body 1 and the upper part of the track shaft 2 to be fitted in the cavity 7 take the shape of an isosceles trapezoid, any trapezoidal shape other than the isosceles trapezoidal shape may be employed in the case where the load applied to the upper surface of the main body 1 is nonuniform at the right and left sides thereof.

According to this embodiment, the main body is provided on its lower side with the cavity in the shape of a trapezoid diverging toward the opend end, and the track shaft has its upper part formed into a trapezoidal shape so as to be fitted in the trapezoidal cavity in the main body with a predetermined clearance therebetween. Further, the opposing raceway grooves of substantially semicircular cross-section are formed in the inner surfaces of the sleeve portions of the main body, which define the trapezoidal cavity therebetween, and the inclined surfaces of the upper part of the track shaft, so as to constitute loaded ball regions in the endless tracks for the balls for bearing a load. Accordingly, it is possible to increase the area of contact between each ball in the loaded ball regions and the corresponding raceways on the main body and the track shaft, so that the bearing can bear a large load applied in vertical, horizontal and radial directions.

Moreover, since the number of the endless tracks formed on the main body and the raceway grooves formed on the track shaft is reduced to a half of that for the conventional linear slide bearing of this kind, the number of the troublesome machining processes required for forming these endless tracks and raceways is decreased correspondingly. Accordingly, the production cost of the bearing can be greatly reduced.

Although the invention has been described through specific terms, it is to be noted here that the described embodiments are not exclusive and various changes and modifications may be imparted thereto without departing from the scope of the invention which is limited solely by the appended claims.

What is claimed is:

1. A linear slide bearing adapted to slidably mount a mounting table on a bed comprising:
   a main body of substantially inverted U-shaped cross-section having a horizontal portion and a pair of sleeve portions downwardly extending from both ends of said horizontal portion and defining therebetween a cavity on the lower side of said main body, each sleeve having a raceway groove of substantially semicircular cross-section formed in its inner surface along the longitudinal direction thereof, and each sleeve further having a recirculating ball bore longitudinally extending therethrough;
   a track shaft having its upper part fitted in said cavity in said main body with a predetermined clearance therebetween, said track shaft being provded, in each of the side surfaces facing the inner surfaces of both sleeve portions of said main body, with a raceway groove of substantially semicircular cross-section extending in the longitudinal direction of said track shaft while confronting the corresponding one of said raceway grooves formed in the inner surfaces of said sleeve portions to constitute a loaded ball region;
   a pair of covers adapted to be attached to both longitudinal ends of said main body, each cover being provided in its inner surface with guide grooves for providing communication between said recirculating ball bores and loaded ball regions to constitute endless tracks, respectively;
   two rows of balls disposed between the opposed raceway grooves in the sleeve inner surfaces and the track shaft side surfaces so as to be recirculated through said endless tracks for bearing loads acting in all directions including lateral and vertical directions between said main body and said track shaft;
   said horizontal portion of aaid main body having at its top a mounting surface inclined in either direction with respect to a mounting surface constituted by the bottom surface of said track shaft;
   each of said raceway grooves formed in said main body and said track shaft being constituted by a circular arch groove having an inner surface with a curvature radius slightly larger than that of said balls such as to provide two-point contact between said balls and said raceway grooves; and
   said main body being adapted to receive bolt means for securing said main body to said mounting table such that tightening of said bolt means applies a twisting force to said main body because of said inclined mounting surface to thereby apply a preload between said balls and said raceway grooves.

2. A linear slide bearing according to claim 1 wherein the inner surface of each raceway groove has its curvature center located on either one of two imaginary lines inclined at 45° from vertical and passing through the center of each ball in said loaded ball regions, and wherein the mounting surface of said main body is inclined in the same direction as either one of said imaginary lines passing through both the curvature center of said inner surface and the center of said ball.

3. A linear slide bearing table unit comprising:
   a bed; and
   a mounting table slidably supported on said bed through a pair of bearings disposed in parallel to each other,
   wherein each of said bearings includes:
   a track shaft adapted to be secured to said bed at a mounting surface constituted by the bottom surface thereof, said track shaft being provided in each of its side surfaces with one raceway groove of substantially semicircular cross-section extending in the longitudinal direction thereof;
   a main body of substantially inverted U-shaped cross-section having a horizontal portion and a pair of sleeve portions downwardly extending from both ends of said horizontal portion, said main body being provided on the lower side thereof with a cavity through which said main body is slidably fitted on the upper part of said track shaft, each of said sleeve portions being provided in its inner surface with a raceway groove of substantially semicircular cross-section extending in the longitudinal direction thereof while confronting the corresponding one of said raceway grooves formed in the side surfaces of said track shaft to constitute a loaded ball region, each sleeve portion further having a recirculating ball bore longitudinally extending therethrough, said horizontal portion having its upper surface adapted to serve as a mounting surface which is inclined in either direction with respect to said mounting surface constituted by the bottom surface of said track shaft;
   a pair of covers adapted to be attached to both longitudinal ends of said main body, each cover being provided in its inner surface with guide grooves for providing communication between said recirculating ball bores and loaded ball regions thereby to constitute endless tracks, respectively;

two rows of balls disposed between the opposed raceway grooves in the sleeve inner surfaces and the track shaft side surfaces so as to be recirculated through said endless tracks for bearing loads acting in all directions including lateral and vertical directions between said main body and said track shaft;

at least a pair of connecting bolts for securing said main body to said mounting table at said mounting surface constituted by the upper surface thereof, said connecting bolts being disposed away from each other in the widthwise direction of said main body;

each of said raceway grooves formed in said main body and said track shaft being constituted by a circular arch groove having an inner surface with a curvature radius slightly larger than that of said balls such as to provide two-point contact between said balls and said raceway grooves; and said horizontal position of said main body having at its top a mounting surface inclined in either direction with respect to a mounting surface constituted by the bottom surface of said track shaft such that tightening of said bolts applies a twisting force to said main body because of said inclined mounting surface to thereby apply a preload between said balls and said raceway grooves.

4. A linear slide table unit according to claim 3, wherein each raceway groove is so formed that the curvature center of the inner surface thereof is located on either one of two imaginary lines inclined at 45° from vertical and passing through the center of each ball within said loaded ball region, and wherein the mounting surface of said main body is inclined in the same direction as either one of said imaginary lines passing through both the center of said inner surface and the center of said ball.

* * * * *